(12) United States Patent
Propp et al.

(10) Patent No.: US 6,962,731 B2
(45) Date of Patent: Nov. 8, 2005

(54) SYSTEM CONFIGURED FOR APPLYING MULTIPLE MODIFYING AGENTS TO A SUBSTRATE

(75) Inventors: W. Alan Propp, Idaho Falls, ID (US); Mark D. Argyle, Idaho Falls, ID (US); Stuart K. Janikowski, Idaho Falls, ID (US); Robert V. Fox, Idaho Falls, ID (US); William J. Toth, Idaho Falls, ID (US); Daniel M. Ginosar, Idaho Falls, ID (US); Charles A. Allen, Idaho Falls, ID (US); David L. Miller, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 71 days.

(21) Appl. No.: 10/669,662

(22) Filed: Sep. 23, 2003

(65) Prior Publication Data

US 2004/0058085 A1 Mar. 25, 2004

Related U.S. Application Data

(62) Division of application No. 09/671,459, filed on Sep. 27, 2000, now Pat. No. 6,652,654.

(51) Int. Cl.[7] .............................. B05D 1/18; C23C 16/00
(52) U.S. Cl. ................. 427/430.1; 427/402; 427/434.2; 427/434.6; 118/718
(58) Field of Search .......................... 427/430.1, 434.2, 427/434.6, 402; 118/718

(56) References Cited

U.S. PATENT DOCUMENTS

| | | | |
|---|---|---|---|
| 2,545,576 A | 3/1951 | Godley et al. | |
| 2,965,067 A | 12/1960 | Amelotte et al. | |
| 3,473,950 A | 7/1967 | Wong | |
| 3,397,672 A | 8/1968 | Dykeman et al. | |
| 3,783,001 A | 1/1971 | Marzocchi | |
| 3,650,042 A | 3/1972 | Boerger et al. | |
| 4,015,558 A * | 4/1977 | Small et al. | 118/668 |
| 4,537,610 A | 8/1985 | Armstrong et al. | |
| 4,552,786 A | 11/1985 | Berneburg et al. | |
| 4,567,102 A | 1/1986 | Pollett et al. | |
| 4,582,731 A | 4/1986 | Smith | |
| 4,734,227 A | 3/1988 | Smith | |
| 4,734,451 A | 3/1988 | Smith | |
| 4,841,908 A * | 6/1989 | Jacobson et al. | 118/718 |
| 4,961,913 A | 10/1990 | Sullivan | |
| 4,970,093 A | 11/1990 | Sievers et al. | |
| 5,013,366 A | 5/1991 | Jackson et al. | |
| 5,032,568 A | 7/1991 | Lau et al. | |
| 5,034,276 A | 7/1991 | Zwiersch et al. | |
| 5,035,921 A | 7/1991 | Berneburg et al. | |
| 5,055,119 A | 10/1991 | Flautt et al. | |
| 5,213,851 A | 5/1993 | Snyder et al. | |
| 5,313,965 A | 5/1994 | Palen | |
| 5,709,910 A | 1/1998 | Argyle et al. | |
| 5,977,348 A | 11/1999 | Harris et al. | |
| 5,997,956 A | 12/1999 | Hunt et al. | |
| 6,495,204 B1 * | 12/2002 | Allen et al. | 427/220 |
| 6,660,088 B2 | 12/2003 | Prince et al. | |

* cited by examiner

Primary Examiner—Elena Tsoy
(74) Attorney, Agent, or Firm—Trask Britt, P.C.

(57) ABSTRACT

The present invention is related to the modifying of substrates with multiple modifying agents in a single continuous system. At least two processing chambers are configured for modifying the substrate in a continuous feed system. The processing chambers can be substantially isolated from one another by interstitial seals. Additionally, the two processing chambers can be substantially isolated from the surrounding atmosphere by end seals. Optionally, expansion chambers can be used to separate the seals from the processing chambers.

19 Claims, 1 Drawing Sheet

US 6,962,731 B2

SYSTEM CONFIGURED FOR APPLYING MULTIPLE MODIFYING AGENTS TO A SUBSTRATE

RELATED APPLICATION

This application is a divisional application of U.S. patent application Ser. No. 09/671,459 filed Sep. 27, 2000 now U.S. Pat. No. 6,652,654 and is incorporated by reference.

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

FIELD OF THE INVENTION

The present invention is related to systems configured for modifying various substrates with multiple modifying agents.

BACKGROUND OF THE INVENTION

Methods have been developed for the coating or modification of various substrates including textile yarns, fibrous materials, filaments, and the like. For example, polystyrene is known to be a good coating for glass optical fibers to increase durability. These coatings, however, are generally applied in a variety of ways with chemical treatment processes. Some of these methods of chemical treatment (for coating, impregnation, surface modification, etc.) include solvent-based systems and melt-based systems.

Solvent-based chemical treatment systems can include organic or inorganic materials in solutions such as aqueous solutions wherein the organic or inorganic material is dissolved, suspended, or otherwise dispersed in the solution. In the area of coating of glass fibers, U.S. Pat. Nos. 5,055,119, 5,034,276 and 3,473,950 disclose examples of such chemical treatments. Typically, with chemical treatment of some of the prior art, solvents are used to lower the viscosity of the chemical treatment to facilitate wetting of the glass fibers. The solvent is substantially unreactive with the other constituents of the chemical treatment and is driven out of the chemical treatment after the wetting of the glass fibers. In each process for applying solvent-based chemical treatments, an external source such as heat can be used to evaporate or otherwise remove the water or other solvent from the applied chemical treatment, leaving a coating of organic material on the glass fibers. With melt-based chemical treatment systems, thermoplastic-type organic solids can be melted and applied to various fibrous structures. Again, in the area of glass coating, U.S. Pat. Nos. 4,567,102, 4,537,610, 3,783,001 and 3,473,950 disclose examples of such melt-based chemical treatments of glass fibers. These methods and others have been used in the prior art to coat various elongated materials including textile yarns, monofilaments, bundles of monofilaments, and fibrous structures.

Supercritical fluids have been used previously to coat elongated materials such as fibers, metals, and the like. However, when such supercritical fluids have been used, they have typically been applied by one of a few methods. Several of these techniques involve the application of one or more modifying agent by batch soaking in an enclosed chamber. Other methods include processes based upon spraying from a pressurized chamber through a narrow nozzle.

With regard to spray-on deposition, air pressure sprayers have been used to contain supercritical and near-critical fluids (carriers) containing coating material. Upon spraying of the fluid onto the substrate, the supercritical fluid carryier and the coating material leave the high pressure environment and are exposed to a normal atmospheric environment. Thus, the supercritical fluid is exposed to low pressure and evaporates, leaving behind the coating material or modifying agent, which is deposited onto, or modifies the substrate, respectively. Examples of typical spray depositions of the prior art include U.S. Pat. Nos. 4,582,731, 4,734,227, 4,734,451, 4,970,093, 5,032,568, 5,213,851, and 5,997,956. Regarding supercritical fluid batch processes, the substrate is typically immersed and then the pressure is dropped, depositing the coating. This is usually followed by a drying stage. In a related embodiment, fluorocarbon polymers can be used to enhance solubility of polar components in supercritical fluid. However, this is still a batch process.

Though the use of liquified gas, supercritical fluids, and near supercritical liquids and gases have been used to coat solid or other fibrous substrates in the prior art, none presently known by the applicant appear to provide a system for modifying substrates, particularly elongated substrates, with multiple modifying agents in a single continuous system.

SUMMARY OF THE INVENTION

The present invention is drawn to a system configured for applying multiple modifying agents to a substrate. The system comprises a first processing chamber configured for applying a first modifying agent to a substrate and a second processing chamber configured for applying a second modifying agent to the same substrate. The modifying agents can be applied in series, one after the other as part of a continuous feed. A first interstitial seal is disposed between the first processing chamber and the second processing chamber. This interstitial seal is optional and can be configured for substantially separating fluids present in each processing chamber. A pair of end seals are also disclosed in relation to the present invention. Specifically, a first end seal can be disposed adjacent to the first processing chamber, and a second end seal can be disposed adjacent to the second processing chamber. Each of the end seals are configured for substantially separating the fluids present in each of the processing chambers from the surrounding atmosphere. A passageway is provided within the device configured for passing the substrate through the first end seal, the first chamber, the interstitial seal, the second chamber, and the second end seal in series.

Though not required, at least one expansion chamber can be disposed between each of the seals and each of the processing chambers. For example, with respect to the first processing chamber, at least one seal can be disposed between the first end seal and the first processing chamber and at least one expansion chamber can be disposed between the first processing chamber and the interstitial seal. With respect to the second processing chamber, at least one expansion chamber can be disposed between the second end seal and the second processing chamber at least one expansion chamber can be disposed between the second processing chamber and the interstitial seal.

Additionally, a method of continuously modifying an elongated substrate with multiple modifying agents can comprise the steps of: a) providing a continuous treatment apparatus comprising a first processing chamber configured for applying a first modifying agent to the substrate, a second processing chamber configured for applying a second modifying agent to the substrate after the first modifying agent is applied to the substrate, wherein each of the first and second modifying agents are substantially isolated from the other; and b) continuously passing the substrate through the first processing chamber and the second processing chamber in series, such that the first modifying agent acts upon the substrate and the second modifying agent subsequently acts upon the substrate.

BRIEF DESCRIPTION OF THE DRAWINGS

In the accompanying drawing which illustrates an embodiment of the invention.

DETAILED DESCRIPTION OF THE INVENTION

Figure 1:
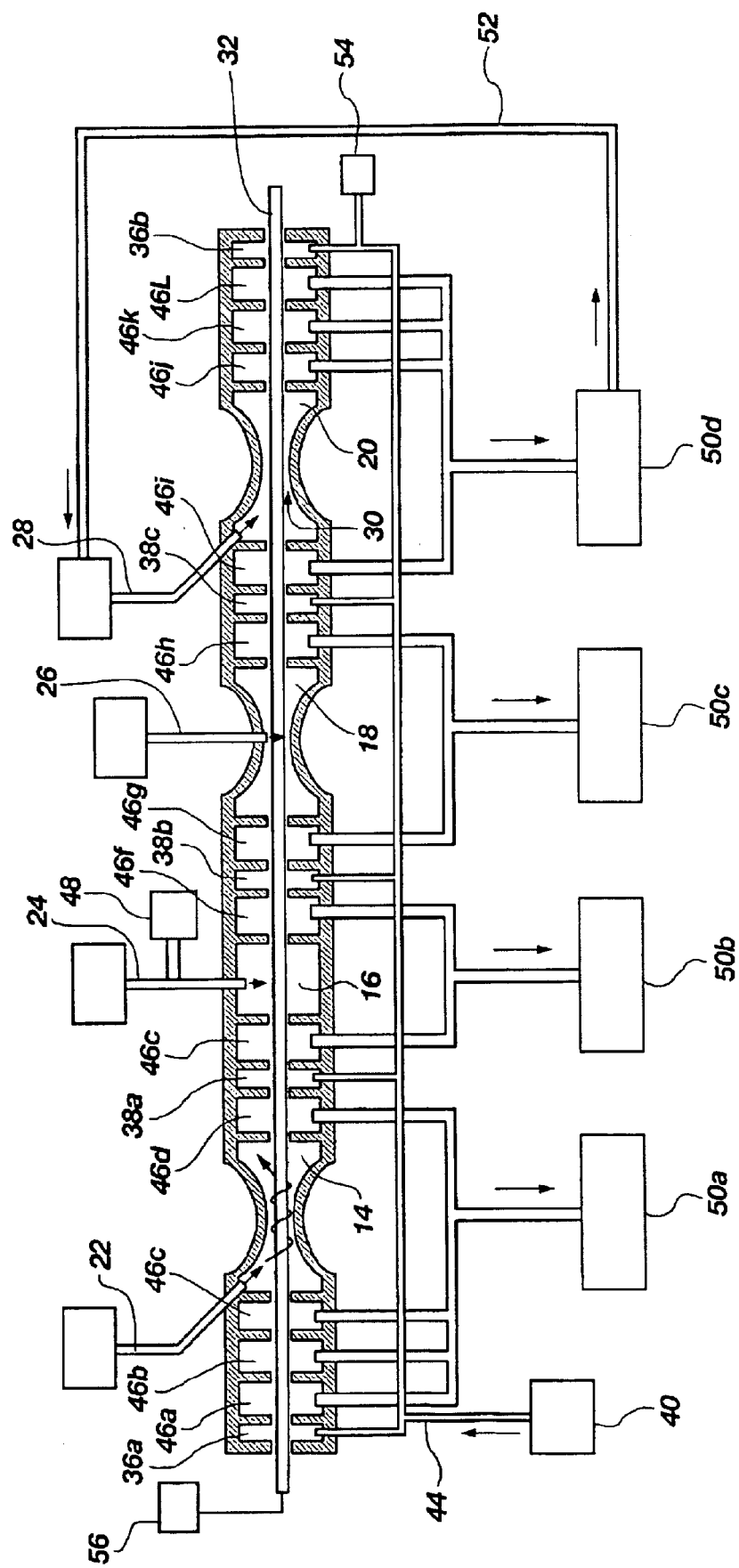
FIG. 1 is a schematic representation of an embodiment of the system of the present invention.

Before the present invention is disclosed and described, it is to be understood that this invention is not limited to the particular configurations, process steps and materials disclosed herein as these may vary to some degree. It is also to be understood that the terminology used herein is used for the purpose of describing particular embodiments only, and is not intended to be limiting as to the scope of the present invention. The invention will be limited only by the appended claims and equivalents thereof.

It must be noted that, as used in this specification and the appended claims, singular forms of "a," "an," and "the" include plural referents unless the content clearly dictates otherwise.

For the purposes of this document, "substrate" can include any structure that is elongated along at least one axis including, but are not limited to textile yarns, monofilaments, bundles of monofilaments, fibrous structural materials, fibrous high-strength materials, fibrous construction materials, and fibrous engineered materials including optical fibers, filaments, cables, fiberglass, glass fibers, ceramic fibers, graphite fibers, composites fibers, metal fibers and wires. Such structures can be constructed of metals, alloys, inorganics, organometallics, salts, minerals, structural polymers, single-strand polymers, filamentous polymers, and the like. If the substrate is other than wire-like in shape, i.e., elongated along one axis and non-equidimensional along the plane perpendicular to the direction of travel through the system (sheet-like, U-shaped, etc.), then the passageway of the system can be configured accordingly to accept such a substrate. Otherwise, the passageway can be configured to accept cylindrical substrates.

"Supercritical fluid" shall be defined as a carrier or a carrier/chemical modifier mixture which is at a temperature above its critical temperature.

"Near-critical fluid" includes conditions where the carrier is either at or below the critical temperature or pressure for the carrier (or carrier with the chemical modifier) wherein the properties of the mixture are at a state where they begin to approach those of a supercritical fluid. Near-critical fluid can further be divided into subcatagories "near-critical gas phase" and "near-critical liquid phase" depending on the state that the fluid is in. "Near-critical gas phase" exists at pressures either less than or equal to the critical pressure and less than the bubble point pressure with temperatures somewhat below to above the critical temperature ($0.9T_c$ and above). "Near-critical liquid phase" is defined as the phase that exists at temperatures either less than or equal to the critical temperature and pressures either greater than or equal to the bubble point pressure of the carrier and/or the carrier and the chemical modifier.

"Liquefied gas" includes all gases that are at a temperature and/or pressure where they are in a liquid state, but can readily be changed to a gaseous state by altering the temperature or pressure.

"Superheated fluid" shall be defined as all liquids that can readily be changed to a gaseous state by reducing the pressure. Typically, this is a liquid which is heated above the temperature at which a change of state would normally take place without any change of state having occurred. An example would be pressurized water above 100° at sea level.

"Superheated liquid" shall be defined a liquid, which is heated above the temperature at which a change of state would normally take place, without said change of state having occurred. An example would be pressurized water above 100° C.

"Modifying agent" and "modifying composition" can be used interchangeably and shall include any substance used for chemical or non-chemical modification of a substrate. Thus, organic coatings, inorganic coatings, reactive coatings, sensor coatings, catalytic coatings, conductive coatings, material expanders, impregnators, extractors, surface functionalizers, and other modifiers are included within the present definition.

"Fluid" or "critical fluid" used generically shall include supercritical fluid, near-critical fluid, superheated fluid, superheated liquid, and liquefied gas, unless the context clearly dictates otherwise.

"Treatment mixture" or "process fluid" shall include any mixture of a carrier (preferably a fluid carrier as defined above) and a modifying agent.

Turning now to FIG. 1, a schematic representation of an embodiment of a system of the present invention is shown. The device is defined generally by a housing 8 which is capable of substantially retaining treatment mixtures, seal fluids, and other fluids used in the device. Baffles 10 are shown which define a passageway 12 within the housing 8. The passageway 12 is preferably slightly larger than the substrate 32 which is passed through the device. Depending on the shape of the elongated substrate 32, the shape of the passageway 12 can be configured accordingly. The device of the embodiment shown has four separate processing chambers 14,16,18,20 which can each independently serve a separate function from the other chambers.

Processing chamber 14 is a venturi chamber that can be used to substantially prepare the substrate passing through the device for further modification. A first injector 22 is shown that is positioned at a tangential angle such that process fluids injected therein are caused to swirl around a substrate 32. Appropriate chemicals or substrate modifiers can be used to carry out the function of substrate preparation. For example, chamber 22 can be configured to clean the substrate, remove chemical compositions from the substrate, initiate reactions, etc.

Processing chamber 16 is a chamber capable of containing a fluid for modifying the substrate as it passes through the chamber continuously. A second injector 24 can be used to fill the chamber with a process fluid or treatment mixture while maintaining a specific temperature and/or pressure ideal for the desired modification of the substrate. Though not required, pressures and temperatures can be used to create supercritical, near-critical, superheated, and liquified gas conditions of a carrier and/or a modifying agent. Alternatively, this chamber 16 can be used for conventional contact processing. However, the substrate is not merely modified at one time, but is continuously passed through the contacting chamber and is modified continuously as it travels through the chamber.

Processing chamber 18 shows an impregnation chamber. Thus, injector 26 is positioned in close proximity to the passageway (and thus, the substrate) such that high pressure impregnation through injector 26 can be effectuated.

Processing chamber 20 is configured similarly to processing chamber 14, but can be used for a different function. For example, as processing chamber 14 was used for a cleaning purpose, processing chamber 20 can be used to coat the substrate with a modifying agent. Injector 28 can be used to inject a treatment mixture comprised of a carrier, e.g., supercritical, near-critical, superheated, or liquefied gas, and a modifying agent into processing chamber 20. By injecting the treatment mixture in at a tangential angle into a constricted region 30 of processing chamber 20, the fluid can swirl around the continuous substrate through the constricted region 30. Thus, upon a pressure drop, the modifying agent can be deposited onto or into the substrate.

Each of the processing chambers 14,16,18,20 are substantially isolated from the exterior atmosphere 34 by a pair of end seals 36a,b. Additionally, the processing chambers are substantially isolated from one another by three interstitial seals 38a,b,c. Preferably, the end seals 36a,b and the interstitial seals 38a,b,c are pressurized by a fluid such as a gas. A fluid compressor 40 is used to regulate the amount of pressure maintained in the end seals 36a,b and interstitial seals 38a,b,c. Though this embodiment shows a connected network of conduits 44 to pressurize all the seals, each seal can be individually pressurized or pressurized in groups by additional fluid compressors or use of pressure regulators.

Though not required, each of the processing chambers 14,16,18,20 are separated from their nearest seals by expansion chambers 46a–l. These expansion chambers allow for better control of pressure and temperature between the processing chambers and the interstitial and end seals as well as facilitate the removal of excess processing chamber fluids from the device. For example, if processing chamber 14 is a high pressure chamber, and the surrounding atmosphere 34 is one atmosphere, three expansion chambers, as shown, can provide adequate pressure increase from the exterior atmosphere to the high pressure found in processing chamber 14. Thus, expansion chamber 46a can have a lower pressure than the expansion chamber 46b, which can have a lower pressure than expansion chamber 46c. Thus, the fluid pressure found in end seal 36a need only be slightly greater than the pressure found in expansion chamber 46a in order to substantially prevent leakage of processing chamber fluids into the surrounding atmosphere. Though three expansion chambers 46a,b,c are shown between processing chamber 14 and end seal 36a, more or less may be required depending on the application and pressure requirements of the specific application. The same is true for all of the expansion chambers 46a–l. For example, only one expansion chamber is shown between each interstitial seal 38a,b,c and each chamber 14,16,18,20. However, more than this or none may be used, depending upon the application.

With respect to the end seals, prior to the substrates entry or exit from the device to normal atmospheric pressure (or other exterior pressure conditions), a smoother pressure transition from the pressure inside the device to the pressure outside the device can be effectuated with the use of expansion chambers 46a,b,c,j,k,l. Additionally, with some applications (as shown with respect to processing chamber 16), heaters 48 can be used to maintain or change temperatures as needed. Thus, by controlling the processing chamber pressures and temperature in each individual chamber, and by substantially separating the chamber with seals, each process application can have its own unique set of pressure and temperature conditions.

Each individual chamber and associated expansion chambers can also have its own collection or extraction chamber 50a–d. This is due to the substantial isolation provided by the end seals 36a,b and the interstitial seals 38a,b,c. For example, with respect to processing chamber 20, collection chamber 50d provides a location for collection of seal fluids that may leak from end seal 36b or interstitial seal 38c into the expansion chambers 46i,j,k,l. Additionally, process fluids, i.e., treatment mixtures, that may leak from processing chamber 20 into the expansion chambers 46i,j,k,l can also be collected in collection chamber 50d. A recycling conduit 52 is shown between collection chamber 50d and injector 28 indicating that the process fluids containing unused modifying agents can be recycled for further use. Collection chambers 50a,b,c can be configured to function similarly.

Additional optional features can include a pressure regulator 54 for regulating the pressure in any of the chambers. In the embodiment shown, a pressure regulator is shown which regulates the pressure of end seal 36b. Additionally, variable control of the speed of the substrate 32 trough the device can be controlled by a substrate feed controller 56 which is represented schematically.

With these figures in mind, the present invention is drawn to a system configured for applying multiple modifying agents to a substrate, substantially isolated from a surrounding environment. The system comprises a first processing chamber configured for applying a first modifying agent to a substrate and a second processing chamber configured for applying a second modifying agent to the same substrate. The modifying agents are typically applied in series, one after the other in a continuous feed system. A first interstitial seal can optionally be disposed between the first processing chamber and the second processing chamber. This interstitial seal can be configured for substantially separating fluids present in each chamber from one another. A pair of end seals are also disclosed in relation to the present invention. Specifically, a first end seal can be disposed adjacent to the first chamber and the second end seal can be disposed adjacent to the second chamber. Each of the end seals are configured for substantially separating the fluids present in each of the chambers from the surrounding atmosphere. A passageway can be configured within the device for passing the substrate through the first end seal, the first chamber, the interstitial seal, the second chamber, and the second end seal in series.

Though not required, it is preferred that at least one expansion chamber be disposed between each of the seals and each of the processing chambers. For example, with respect to the first processing chamber, at least one seal can be disposed between the first end seal and the first processing chamber and at least one expansion chamber can be disposed between the first processing chamber and the interstitial seal. With respect to the second processing chamber, at least one expansion chamber can be disposed between the second end seal and the second processing chamber and at least one expansion chamber can be disposed between the second processing chamber and the interstitial seal.

Though two processing chambers are disclosed above, more than two chambers can be provided for certain functions. However, if a third processing chamber is added, an additional interstitial seal can preferably also be added to keep the third processing chamber substantially separate from the other processing chambers. Thus, in one embodiment, a second interstitial seal and a third processing chamber can be disposed between the second processing chamber and the second end seal. If a fourth processing chamber is desired, such as that shown in FIG. 1, a third interstitial seal and a fourth processing chamber can be added and disposed between the third processing chamber and the second end seal.

As stated, each processing chamber can be configured to function completely separately from other processing chambers. For example, one processing chamber can functionalize a surface of a substrate, and a second processing chamber can apply a coating onto that functionalized surface. Therefore, different functions can occur in each chamber. Exemplary processing chamber functions can include venturi application chambers, contacting chambers, impregnation chambers, cleaning chambers, chemical reaction chambers, absorption chambers, adsorption chambers, and desorption chambers, to name a few. These chambers can be shaped or configured appropriately for a given application.

To illustrate one example, a modifying agent can be applied to a substrate in one or more of the processing chambers by continuously passing the substrate through the passageway within the first processing chamber wherein the processing chamber comprises a first region, a second region, and a constricted medial region between the first region and the second region. The processing chamber can be further configured to accept a treatment mixture into the constricted medial region of the passageway during movement of said substrates through the processing chamber. The treatment mixture can further be comprised of a modifying agent in a carrier medium wherein the carrier medium is selected from the group consisting of a supercritical fluid, a near-critical fluid, a superheated fluid, a superheated liquid, and a liquified gas, such that the modifying agent will separate from the carrier medium upon a pressure drop when the mixture is introduced into the constricted medial region of the passageway. Thus, the modifying agent can be applied to the substrate to produce a modified substrate. In this embodiment, the injector can introduce the treatment mixture at a tangential angle such that the treatment mixture is introduced to the substrate at or near the constricted medial region and as the mixture swirls around the substrate. Such a configuration can be used to apply the modifying agent to the substrate in either a co-current manner, i.e., substrate movement in the direction of the treatment mixture injection, or a counter-current manner, i.e, substrate movement in the opposite direction of the treatment mixture injection.

The injector can be configured to inject the process fluids tangentially, perpendicularly, or at any other functional angle. For example, a tangentially angled injector could be used in a chamber having two larger opposing regions, separated by a constricted medial region. Additionally, multiple injectors can be used to ensure that all surfaces of the non-equidimensional substrate can be appropriately modified. Alternatively, a perpendicular injector at close proximity to a substrate could be used to impregnate the substrate with higher pressure injections. In another embodiment, the processing chamber can utilize a treatment mixture comprised of the modifying agent and a carrier for applying the modifying agent, wherein the carrier is selected from the group consisting of supercritical fluid, near-critical fluid, superheated fluid, superheated liquid, and liquefied gas.

Though the use of supercritical fluid, near-critical fluid, superheated fluid, superheated liquid, and liquified gas applications have been described with respect to a venturi chamber, this is not the only application where the use of such fluids can be effective in the modification of a substrate. Any chamber configuration can be used with such fluids, provided the conditions are right to modify a substrate as is desired.

As stated, injectors can be used to infuse treatment mixtures or other process fluids into the processing chambers. The injector can be configured to inject the process fluids tangentially, perpendicularly, or at any other functional angle. For example, a tangentially angled injector could be used in a chamber having two larger opposing regions, separated by a constricted medial region, such as in a venturi or other similarly configured chamber. Alternatively, a perpendicular injector at close proximity to a substrate could be used to impregnate the substrate with higher pressure injections. In one embodiment, whether or not a venturi chamber as described is used, at least one of the first processing chamber and the second processing chamber can utilizes a treatment mixture comprised of the modifying agent and a carrier for applying the modifying agent, wherein the carrier is selected from the group consisting of supercritical fluid, near-critical fluid, superheated fluid, superheated liquid, and liquefied gas.

Extraction or collection chambers can be fluidly coupled to each of the processing chambers for periodically or continuously removing unused material, i.e., seal fluids, carrier, and/or modifying agents, from the processing chambers. Because the end seals and the interstitial seals substantially separate the fluids from each processing chamber, it is preferred that each processing chamber have its own extraction or collection chamber. If expansion chambers are present, then the collection chambers can be fluidly connected to the processing chambers through the expansion chambers. If desired, the fluids collected in the collection chambers can be recycled for further use. In some instances, a further processing step can occur before reusing any treatment mixture collected as may be ascertained by one skilled in the art.

The end seals and the interstitial seals can be gas (or other fluid) filled seals. However, gas filled seals are not the only functional seals that can be used. For example, these seals can simply be configured as a physical constriction or other barrier that is functional with the present system. If a gas filled seal is used, exemplary gases for use can include air, carbon dioxide ($CO_2$), nitrogen ($N_2$), helium, argon, nitrogen dioxide ($NO_2$), or other compatible process solvents or fluids. In one embodiment, the gas used in the seals can be essentially inert to the modification process that is occurring in the nearby processing chambers. However, the seals can also be used as buffer zones between processing chambers. Additionally, any parameter can be used to separate the chambers such as temperature, pressure, or chemical and solvent selection. Multiple fluid filled seals can either be controlled by a single fluid compressor, or each seal (or groups of seals) can be individually controlled by its own compressor, pressure regulator, or combination of compressor and pressure regulator.

As mentioned, the present device utilizes multiple application chambers or cells to each independently modify a substrate in a continuous system. Depending on the size or configuration of the substrate, the passageway within the chambers are sized slightly larger than the substrate that passes through the device to minimize the amount of process fluids or chemical composition that can pass from one chamber to the next. For example, as the substrate passes from one chamber to the next, process fluids can leak into the adjacent chamber(s). The amount of process fluid that leaks into adjacent chamber(s) is controlled by controlling the pressure in the adjacent chamber(s). This can be accomplished by pressure loss from the flow of fluid from one chamber to the next or by removal of excess process fluid from the adjacent chamber for recycle. Most of the processing chambers of FIG. 1 show only one adjacent expansion chamber. However, multiple adjacent expansion chambers, each controlled at a specific pressure in a similar method as described above, may be used to better control the pressure drop from one chamber to the next within the device as required by the specific application. Additionally, FIG. 1 shows three expansion chambers and a seal chamber between the fourth processing chamber and the exterior environment. However, more or less may be required depending on the application and pressure requirements of the specific application. Thus, prior to entry or exit from the device to normal atmospheric pressure (or other desired exterior pressure), a smoother pressure transition from the pressure inside the device to the pressure outside the device can be effectuated. As mentioned, with some applications, heaters can be used to maintain temperatures in a specific chamber. Control of chamber pressures and temperature allows each process application to have its own unique set of pressure and temperature conditions.

In the area of textiles, a system for dying or sizing textile yarns has been disclosed that departs from typical batch processes previously known. Specifically, U.S. Pat. No. 5,709,910, the entire teachings of which are incorporated herein by reference, discloses methods for applying textile treatment compositions to textile materials. This system comprising a conduit member which includes a passageway having a first end, a second end, and a medial portion with a constricted (narrowed) region. The passageway may include at least one baffle having an opening therethrough. In the system, a yarn strand is then moved through the passageway. A sizing agent or dye is dissolved in a supercritical fluid or liquified gas which is thereafter introduced into the constricted region. As the supercritical fluid or liquified gas is forced through the constricted region, the pressure drops and the supercritical fluid or liquified gas changes in properties such that delivery of the treatment dye or sizing agent to the yarn is effectuated. The textile strands or yarn that may be sized or dyed include any textiles yarns such as cottons, linens, polyesters, nylons, rayons, cotton blends, and the like. The textile yarns disclosed therein are lower strength yarns that are comprised of a series of short strand fibers that are spun together to form longer yarn products. Thus, stray fibers are inevitable and thus, provides the need for the use of sizing agents and lubricants, described therein. The temporary lubricant acts to reduce the number of stray fibers that may be damaged by any high speed equipment used in the process of preparing textiles, as well as reduce the friction between textile fibers during weaving. An additional function can include the strengthening of the yarn. Though such a system and method have been shown to be effective for the sizing and dying of yarns, no device or method is currently known that utilizes at least two chambers which act independently of one another in a continuous system. Thus, with respect to textile yarns, a first chamber could be used to dye the substrate, and a second chamber could be used to size the substrate, all in one continuous system.

This system, depending on the specific chamber configuration, allows for the use of enhanced chemical and physical properties of fluids under supercritical, near-critical, superheated, and liquified gas conditions, including solvating power, to treat various substrates in a continuous, efficient manner without the use of such structures as nip rollers. The device upon which the process is based also allows for the recovery of process energy and fluids to minimize waste.

The chemical compositions that can be applied with the system of the present invention include both organic and inorganic materials including various chemical reagents, monomers, polymers, etc. These chemicals include, but are not limited to, various types of organic compounds and polymeric materials including acrylates, acrylic acid monomers, acrylic acid polymers, salts of acrylic acid copolymers, salts of polyacrylic acid, polyacrylates, polyvinyl chlorides, polyvinyl acetate, polyvinyl alcohols, cellulose derivatives, alginates, gums and starches, polyamides, polyimides, urethanes, polyurethanes, synthetic and natural resin varnishes, lacquers, polyphosphazenes, polyesters, polystyrenes, silicones, epoxies, fluoropolymers, etc. Chemical materials can be applied individually, sequentially, or as mixtures.

Virtually any structure can be coated or modified as described herein, provided the coating is functional with the substrate. Specifically, substrates can include continual or finite structures such as textile yarns, monofilaments, bundles of monofilaments, fibrous structural materials, fibrous high-strength materials, fibrous construction materials, and fibrous engineered materials including optical fibers, filaments, cables, fiberglass, glass fibers, ceramic fibers, graphite fibers, composites fibers, metal fibers and wires. Such structures can be constructed of metals, alloys, inorganics, organometallics, salts, minerals, structural polymers, single-strand polymers, filamentous polymers, and the like. If the substrate is other than wire-like in shape, i.e., elongated along one axis and non-equidimensional along the plane perpendicular to the direction of travel through the system (sheet-like, U-shaped, etc.), then the passageway of the system can be configured accordingly to accept such a substrate. Otherwise, the passageway can be configured to accept cylindrical substrates.

Turning to an individual discussion of the various type of substrate modifications that can occur, various modification methods are exemplified. With respect to the present invention, many of these process or substrate modification types described relate to single process chamber modifications, though any of these single process chamber modifications can be used in either the first and/or the second process chamber within the system of the present invention.

The process parameters used to modify a substrate, e.g., apply a coating, are highly dependent upon the modification material and the particular solvent used as the carrier fluid. Temperature and pressure, time of fluid exposure to the modifying material, and factors like turbulence, ultrasound, mechanical mixing, etc. affect the solubility of the modifying material and rate at which the modifying material can be dissolved into the fluid. A suitable range for temperature and pressure is that defined by the following: $0.9T_c \leq T \leq 2T_c$ where T and $T_c$ are expressed in degrees Kelvin, and $0.1P_c \leq P \leq 20P_c$ where P and $P_c$ are expressed in any suitable pressure units.

The first equation states that the useable operating temperature (T) for the solvent has a value equal to, or greater than 0.9 times the value of the critical temperature ($T_c$), and less than or equal to 2 times the critical temperature. The second equation similarly states that the useable operating pressure (P) for the solvent has a value equal to, or greater than 0.1 times the value of the critical pressure ($P_c$), and less than or equal to 20 times the critical pressure.

In general, it is desirable to saturate the fluid with the modifying material or dissolve an amount close to the saturation limit, but any level of solubilization will achieve the effect of substrate modification. In practice, this is highly dependent upon the choice of solvent and solute, and the range can be quite extensive. Two examples are given that illustrate this feature.

To impregnate poly(methyl methacrylate) (PMM) with pyrene to make a chemical sensor, one would dissolve 0.001 mole % pyrene in critical carbon dioxide (within the temperature and pressure conditions established above) and expose the PMM to the critical solution. Note that this is an extremely dilute solution and well below saturation. An example illustrating the opposite extreme where the solute is at 100 mole % (i.e. the solute is the solvent) would be the coating of an optical fiber with a poly-fluorinated hydrocarbon (PFH). In this example, one would bring the PFH to within the conditions described above (2 equations) and expose the optical fiber to the solvent/solute to achieve the desired coating.

Useable concentrations for other solvent/solute mixtures are intermediate between the values given above and are largely governed by the solubility of the solute in the particular critical fluid. The range extends from those that have very small solubility to those that are completely miscible. An example of the first is given above, while an example of the latter would be the use of tributyl phosphate (TBP) dissolved in supercritical carbon dioxide to be used as a decontamination solvent. In this case the solvent ($CO_2$) can be used in smaller proportion than the TBP and even below 10 mole percent.

With respect to organic and inorganic coatings, functional coatings intended to impart some physical attribute to the substrate being coated are included. Some physical attributes can include imparting corrosion resistance, degradation resistance, abrasion resistance, hardness, lubricity, light (or other radiation) reflective or absorptive properties, ductility, elasticity, material thickness, magnetic susceptibility, radiation degradation resistance, stress relief or resistance, thermal tolerance, and other similar attributes. Another function might be to encapsulate the coated material to restrict or modify the movement of chemicals across the coating. The nature of these coatings is that they are superficial and comprise a coating or barrier between the coated material and the external environment.

Organic modifiers or coatings can be comprised in majority or entirely of organic materials. Such organic coatings can include occluded particles or co-deposited organic materials or inorganic materials. In one embodiment, polystyrene in critical fluid acetone can be applied to glass optical fibers to increase durability of the fibers. In another embodiment, varnish in a critical paint thinner can be applied to copper wires for motor windings. In these and other embodiments, urethane or latex with or without nano-sized titania can be applied during the coating process or subsequent to coating and prior to drying of the organic, respectively, to form corrosion resistant materials or solid supported catalysts.

Another coating type includes inorganic coatings. These coatings can be comprised of a majority or entirely of inorganic or non-organic materials, though occluded or co-deposited organic materials or other inorganic materials can also be present. Examples of inorganic coatings include metal and non-metal oxides, silicon, sulfur, or phosphorus-based polymers that may include dopants comprised of metals, organometallics, inorganics, heteroatomic organics, minerals, or salts. In one example, silicone in a fluid petrolium ether can be applied to graphite fibers to impart a dielectric coating.

Reactive coatings refers to functional coatings intended to impart chemical reactivity or a specific chemical nature to various substrates, particularly with respect to otherwise inert or un-reactive materials. Many coatings can be both reactive or non-reactive depending upon the environment surrounding the coating or the specific application for the coating. For example, in the prior art, polyvinyl alcohol has been used as an un-reactive coating to temporarily lubricate textile fibers. However, as part of the present invention, polyvinyl alcohol can be used as a permanent coating to coat an optical fiber so it can behave as a sorbant coating that changes the optical properties of the fiber under differing chemical conditions. Sensor coatings are those coatings that interact with the surrounding environment in a manner that changes one or more of their chemical or physical properties. This sensor characteristic can be used to sense changing conditions in an environment. Sensor materials can be reactive or non-reactive (but interactive) with the environment. As an example of a non-reactive (interactive) coating, pyrene in fluid toluene (carrier) can be applied to glass optical fibers to affect the light transmittance characteristics of the fiber in the presence of explosives. As an example of a reactive coating, polysulphones can be applied via critical fluid toluene or methylene chloride, to optical fibers such that the sulfones react with acidic or basic media and change the light transmitting properties of the fiber.

Catalytic coatings, or coatings that interact chemically with the surrounding environment in a manner wherein the coating behaves as a catalyst in a chemical reaction, can also be formed. An example of a catalytic coatings includes the dissolving of silver chloride and a beta-diketone in fluid carbon dioxide. Thereafter the mixture is directed onto a substrate in the presence of hydrogen. Silver metal will be deposited onto the surface of the substrate and can behave as a catalyst. Additionally, chloroplatinic acid can be dissolved in a fluid water to coat a carbon fiber in accordance with the principals of the present invention. After such a deposition, sodium borohydride can be applied to reduce the platinum to the metallic state. Thus, the coating can be used as a catalyst. Additionally, other salts, solvents, complexing agents, substrates and reducing agents can yield similar results.

Conductive coatings refers to functional coatings that are thermally or electrically conductive. This includes coatings that are metallic, inorganic, organic, or polymeric in nature and/or composition. Metal coatings may be applied directly by coating the metal onto a substrate, or formed indirectly by applying a reactive coating containing the metal in a chemical state that can later be changed to make the coating conductive. For example, a substrate can be coated with a metal-containing flux (e.g. lead in zinc chloride) in fluid alcohol, after which, the coating can be heated or exposed to a chemical environment that would reduce the metal-containing flux to the metallic state (lead in this case). This process would produce "tinned" substrates suitable for soldering applications. Alternatively, a substrate can be coated with a sulfonated polystyrene in fluid acetone. Thus, when exposed to water, it will become electrically conductive. It would be appreciated to one skilled in the art that the use of other metal salts, fluxes, solvents, polymers, etc., will give similar results.

With the present system, the need to utilize multiple-passes to apply more than one coating, for example, is diminished because each processing chamber can be configured to act independently of the other chambers. However, if desired, multiple pass applications through the system disclosed herein are also within the scope of the present invention.

Generally, there are two broad categories of substrate modifications (outside of coating) that can be effectuated which include physical and chemical modification. Physical modifications refers to those modifications that are primarily characterized by, or made to enhance, physical characteristics of the substrate through application of the invention, but not through applying a coating per se. Examples of which are included herein.

Expanded materials include substrates that can be passed through a device like unto the device described herein under fluid pressure, whereupon exiting a higher the pressure region and entering another lower pressure region can cause rapid expansion of the substrate as a fluid is expanded out of the substrate. An example would be to pass a Plexiglas [poly(methyl methacrylate)] substrate through the device pressurized with fluid methylene chloride and hexane, whereupon exiting into a lower pressure region will cause expansion of the Plexiglas.

With regard to impregnation, suspended particulate material can be forced to impregnate a substrate by applying the particulate under pressure as a suspension in a fluid through a constriction, venturi, or other type of orifice that is at a near-contact distance from the substrate. An example would be to use nano-sized graphite particulate suspended in fluid mineral oil that is then applied under pressure to impregnate low-density polyethylene. Alternatively, a metal salt can be dissolved into a fluid and applied to a substrate that has some solubility in the fluid. Then the metal salt can also be converted to the metallic state by appropriate chemistry (reduction or oxidation), resulting in the metal being impregnated into the substrate. An example of this would be to dissolve silver chloride into fluid water/acetone mixture and apply this mixture to a poly(methyl methacrylate) substrate. Next, by contacting the coating with a hydrogen or sodium borohydride, reduction will occur and reduce the silver to the metallic state while imbedded within the substrate.

An example wherein multiple chambers are used to yield an impregnated substrate, i.e., PVC, is also shown below. First, critical methylene chloride is applied to PVC (polyvinyl chloride) in a first chamber. In a subsequent chamber (or in a single venturi type chamber) the pressure is reduced causing an expansion to occur. Next, a fluid mixture of silver chloride and a beta-diketone in fluid carbon dioxide is added to the substrate in a subsequent chamber. After this step, hydrogen is exposed to the substrate to reduce the silver to the metallic state while inside of the substrate. Alternatively, a polyvinyl chloride substrate can be exposed to fluid methylene chloride in a chamber followed by expanding it in a subsequent chamber where the pressure is reduced. Next, by passing the substrate through a reduced-size orifice in which the substrate is pressure-injected with particulate silver or a suspension of particulate silver in a fluid mineral oil suspension, the particular silver is deposited to the substrate. The substrate can then remain unmodified after this last process to yield a silver impregnated polyvinyl chloride substrate, or it can be further processed and contracted by introducing the substrate in yet another chamber to a fluid methylene chloride, whereafter, the substrate would proceed through the expansion chambers where the pressure is gradually reduced. This latter process would yield an impregnated PVC substrate where the surface of the substrate will have been closed over the impregnated particles to some varying degree.

With respect to chemical modification, the chemical characteristics of the substrate can be altered or enhanced. Examples include extraction and surface functionalization. Extractions apply to the removal of some component, such as a soluble component, from the substrate. An example would be to remove a plasticizer, monomer units, or unwanted oligomers from polymer substrates. One application would be to extract unwanted contaminants from soil or other environmental matrices such as removing crude oil from sand and soils where spills have occurred by applying alcohol or hexane in fluid form to a soil as it passed through the device. With respect to surface functionalization, a process and resultant state wherein the surface of the substrate is chemically modified can be accomplished. An example includes the passing of a cellulose substrate through a device described herein and expose it to one or more of fluid nitric acid, phosphoric acid, sulfuric acid, etc. to produce the nitrated, phosphated, sulfated, etc. cellulose, respectively. The nitrated cellulose could be used in explosives while the phosphated or sulfated cellulose could be used as ion-exchange material.

In addition to the coatings and/or chemical modifications described herein, even new materials can be made by combining the individual components, or combinations of components inside the supercritical or fluid region of a device of the present invention. Synthesis of the materials can occur as a singular process in which the material is not coated onto any substrate and exits the device in the general shape of the exiting orifice. Alternatively, new materials could be made in a similar manner, but coated onto a substrate passing through the device. In the latter case, the new material can be added to the substrate coating, impregnation, etc., in a similar manner to the other processes described herein. Additionally, polymer synthesis is also possible by using a device such as that described herein. An example includes the synthesis of polystyrene(co-methyl methacrylate) where the individual components of styrene and methyl methacrylate are initially dissolved in fluid acetone and injected into one of the chambers of the device and allowed to mix. Upon exiting the chamber, the acetone is removed and benzoyl peroxide is injected to initiate the polymerization. Next, the polymer can be extruded through the exiting orifice of the device. Composites, which are those materials that are composed of more than one material and are solid in the finished state, mutually insoluble, and different in chemical nature can also be made. An example of a composite that can be made in this device is the coating of a graphite fiber with Plexiglas. Plexiglas can be dissolved in fluid methylene chloride and introduced into a chamber through which the graphite fiber is moving. In this embodiment, the Plexiglas will deposit onto the fiber and adhere to the fiber upon exiting the chamber where the solvent can be removed.

The current processes will provide coatings and other modifications with superior properties because of improved adhesion, bonding, and chemical reactivity or extraction. Exposure to the fluids during the application processes can also exert a cleaning influence on a substrate, removing surface contaminants that detrimentally affect the ultimate properties of the final product. It is anticipated that these processes can reduce failure rates and defects, and products with superior properties, such as tensile strength can be produced. Additionally, these processes provide opportunities for application of thermally labile or otherwise sensitive chemical compositions to a variety of substrates.

Additionally, a method of continuously modifying an elongated substrate with multiple modifying agents is disclosed comprising the steps of providing a continuous treatment apparatus comprising a first processing chamber configured for applying a first modifying agent to the substrate and a second processing chamber configured for applying a second modifying agent to the substrate after said first modifying agent is applied to said substrate, wherein each of the first and second modifying agents are substantially isolated from the other; and continuously passing the substrate through the first processing chamber and the second processing chamber in series such that the first modifying agent acts upon the substrate and the second modifying agent subsequently acts upon the substrate.

While the invention has been described with reference to certain preferred embodiments, those skilled in the art will appreciate that various modifications, changes, omissions and substitutions can be made without departing from the spirit of the invention. It is intended, therefore, that the invention be limited only by the following claims construed as broadly as applicable law allows including all proper equivalents thereof.

We claim:

1. A method of continuously modifying an elongated substrate with multiple modifying agents comprising:
   providing a first processing chamber configured for applying a first modifying agent to the elongated substrate, the first processing chamber comprising a first region, a second region, and a constricted medial region between the first region and the second region and configuring the first processing chamber to accept a first treatment mixture into the constricted medial region during continuous movement of the continuous substrate through the first processing chamber;
   providing a first treatment mixture comprising the first modifying agent in a first carrier medium, the first carrier medium being selected from the group consisting of a supercritical fluid, a near-critical fluid, a superheated fluid, a superheated liquid, and a liquified gas, such that the first modifying agent separates from the first carrier medium upon a pressure drop when the first treatment mixture is introduced into the constricted medial region;
   applying the first modifying agent to the continuous substrate;
   providing a second processing chamber configured for applying a second modifying agent to the continuous substrate after the first modifying agent is applied to the continuous substrate;
   applying the second modifying agent to the continuous substrate after the first modifying agent is applied to the continuous substrate;
   providing a first end seal disposed adjacent to the first processing chamber configured for substantially isolating fluids present in the first processing chamber from the surrounding atmosphere;
   providing a second end seal disposed adjacent to the second processing chamber configured for substantially isolating fluids present in the second processing chamber from the surrounding atmosphere;
   providing a passageway configured for allowing continuous passage of the continuous substrate through the first end seal, the first processing chamber, the second processing chamber, and the second end seal in series; and
   continuously passing the continuous substrate through the passageway.

2. The method of claim 1, further comprising providing a first interstitial seal disposed between the first processing chamber and the second processing chamber, configured for keeping fluids present in each of the processing chambers substantially separate.

3. The method of claim 2, further comprising providing at least one expansion chamber disposed between the first end seal and the first processing chamber, and further comprising providing at least one expansion chamber disposed between the first processing chamber and the first interstitial seal.

4. The method of claim 3, further comprising providing at least one expansion chamber disposed between the second end seal and the second processing chamber, and further comprising providing at least one expansion chamber disposed between the second processing chamber and the first interstitial seal.

5. The method of claim 2, further comprising providing a second interstitial seal and a third processing chamber disposed between the second processing chamber and the second end seal.

6. The method of claim 5, further comprising providing a third interstitial seal and a fourth processing chamber disposed between the third processing chamber and the second end seal.

7. The method of claim 2, wherein the first processing chamber and the second processing chamber are independently selected from the group consisting of venturi chambers, contacting chambers, impregnation chambers, cleaning chambers, chemical reaction chambers, absorption chambers, adsorption chambers, and desorption chambers.

8. The method of claim 1, further comprising:
   providing the second processing chamber with a first region, a second region, and a constricted medial region between the first region and the second region;
   configuring the provided second processing chamber to accept a second treatment mixture into the constricted medial region of the second processing chamber during continuous movement of the continuous substrate through the second processing chamber; and
   providing a second treatment mixture comprising the second modifying agent in a second carrier medium being selected from the group consisting of a supercritical fluid, a near-critical fluid, a superheated fluid, a superheated liquid, and a liquified gas, and wherein the second modifying agent separates from the second carrier medium upon a pressure drop when the second treatment mixture is introduced into the constricted medial region of the second processing chamber upon applying the second modifying agent to the continuous substrate.

9. The method of claim 1, further comprising configuring the passageway such that the continuous substrate is capable of being passed through the passageway co-currently and passing the continuous substrate through the passageway co-currently.

10. The method of claim 1, further comprising configuring the passageway such that the continuous substrate is capable of being passed through the passageway counter-currently and passing the continuous substrate through the passageway counter-currently.

11. The method of claim 2, further comprising configuring the processing chamber to utilize a second treatment mixture comprising the second modifying agent and a second carrier for applying the second modifying agent, and wherein the second carrier is selected from the group consisting of supercritical fluid, near-critical fluid, superheated fluid, superheated liquid, and liquefied gas.

12. The method of claim 12, further comprising providing an injector configured for injecting the second treatment mixture into the second processing chamber and injecting the second treatment mixture into the second processing chamber.

13. The method of claim 12, further comprising providing the second processing chamber with an enlarged first region, an enlarged second region, and a constricted medial region between the first region and the second region.

14. The method of claim 12, further comprising tangentially angling the injector toward the constricted medial region of the second processing chamber.

15. The method of claim 12, further comprising directing the injector essentially perpendicular to the passageway in the second processing chamber.

16. The method of claim 15, further comprising positioning the injector in close proximity to the passageway such that the injector can impregnate the continuous substrate with a high pressure injection of the second treatment mixture.

17. A method for applying multiple modifying agents to a continuous substrate, substantially isolated from a surrounding atmosphere, comprising:

providing a first processing chamber configured for applying a first modifying agent to the continuous substrate;

providing a second processing chamber configured for applying a second modifying agent to the continuous substrate after the first modifying agent is applied to the continuous substrate;

fluidly coupling the first processing chamber and the second processing chamber to a corresponding collection chamber configured for removing unused modifying agent from at least one processing chamber;

providing a first end seal disposed adjacent to the first processing chamber configured for substantially isolating fluids present in the first processing chamber from the surrounding atmosphere;

providing a second end seal disposed adjacent to the second processing chamber configured for substantially isolating fluids present in the second processing chamber from the surrounding atmosphere;

disposing a first interstitial seal, configured for keeping fluids present in each of the processing chambers substantially separate, between the first processing chamber and the second processing chamber;

providing a passageway configured for allowing continuous passage of the continuous substrate through the first end seal, the first processing chamber, the second processing chamber, and the second end seal in series.

18. The method of claim 17, further comprising fluidly coupling the first processing chamber to a first collection chamber and fluidly coupling the second processing chamber to the second collection chamber.

19. The method of claim 17, further comprising providing at least one expansion chamber which is fluidly disposed between the at least one collection chamber and the corresponding processing chamber.

* * * * *